US012754832B2

(12) United States Patent
Chiew et al.

(10) Patent No.: US 12,754,832 B2
(45) Date of Patent: Oct. 6, 2026

(54) PADDING MEMORY BY PROGRAMMING USER DATA IN PARALLEL

(71) Applicant: Micron Technology, Inc., Boise, ID (US)

(72) Inventors: Chong Giap Chiew, Santa Clara, CA (US); Zhi Yin Chiew, Singapore (SG); Sean Brasfield, Boise, ID (US); Tawalin Opastrakoon, Boise, ID (US)

(73) Assignee: MICRON TECHNOLOGY, INC., Boise, ID (US)

( * ) Notice: Subject to any disclaimer, the term of this patent is extended or adjusted under 35 U.S.C. 154(b) by 90 days.

(21) Appl. No.: 18/791,349

(22) Filed: Jul. 31, 2024

(65) Prior Publication Data

US 2026/0037421 A1 Feb. 5, 2026

(51) Int. Cl.
*G06F 12/02* (2006.01)

(52) U.S. Cl.
CPC ................................ *G06F 12/0223* (2013.01)

(58) Field of Classification Search
CPC ............... G06F 12/0223; G06F 12/023; G06F 12/0238; G06F 12/0246; G06F 3/0611; G06F 3/0619; G06F 3/0638; G06F 3/064; G06F 3/065; G06F 3/0679; G06F 3/0655; G06F 3/0604; G06F 2212/1032; G06F 2212/7204; G11C 16/26; G11C 16/3427; G11C 29/74; G11C 11/5628; G11C 16/0483; G11C 16/32; G11C 2211/5622; G11C 16/08; G11C 16/10
See application file for complete search history.

(56) References Cited

U.S. PATENT DOCUMENTS

| | | | | |
|---|---|---|---|---|
| 2003/0163629 A1* | 8/2003 | Conley | G11C 16/10 | 711/167 |
| 2007/0081386 A1* | 4/2007 | Yoon | G11C 16/105 | 365/185.11 |
| 2008/0155182 A1* | 6/2008 | Kudo | G06F 12/0246 | 711/E12.008 |
| 2008/0175059 A1* | 7/2008 | Kim | G11C 11/5642 | 365/185.11 |
| 2017/0199685 A1* | 7/2017 | Kim | G06F 3/0659 | |
| 2019/0018767 A1* | 1/2019 | Koo | G06F 12/0882 | |
| 2019/0187931 A1* | 6/2019 | Byun | G06F 13/1642 | |
| 2020/0142637 A1* | 5/2020 | Park | G11C 16/3495 | |
| 2023/0176749 A1* | 6/2023 | Hily | G06F 11/1048 | 711/154 |
| 2023/0197163 A1* | 6/2023 | McNeil | G11C 16/28 | 365/189.011 |
| 2024/0282375 A1* | 8/2024 | Ryu | G06F 3/0658 | |

* cited by examiner

*Primary Examiner* — Michael Krofcheck

(74) *Attorney, Agent, or Firm* — NICHOLSON DE VOS WEBSTER & ELLIOTT LLP

(57) ABSTRACT

Methods, systems, and apparatuses include receiving, by a memory subsystem, a parallel programming command from a host device. A wordline of user data is programmed into a target wordline of a memory portion of a memory device. A duplicate of the wordline of user data is programmed to padding wordlines of the memory portion in parallel with the programming of the target wordline using a command mode.

20 Claims, 7 Drawing Sheets

FIG. 2

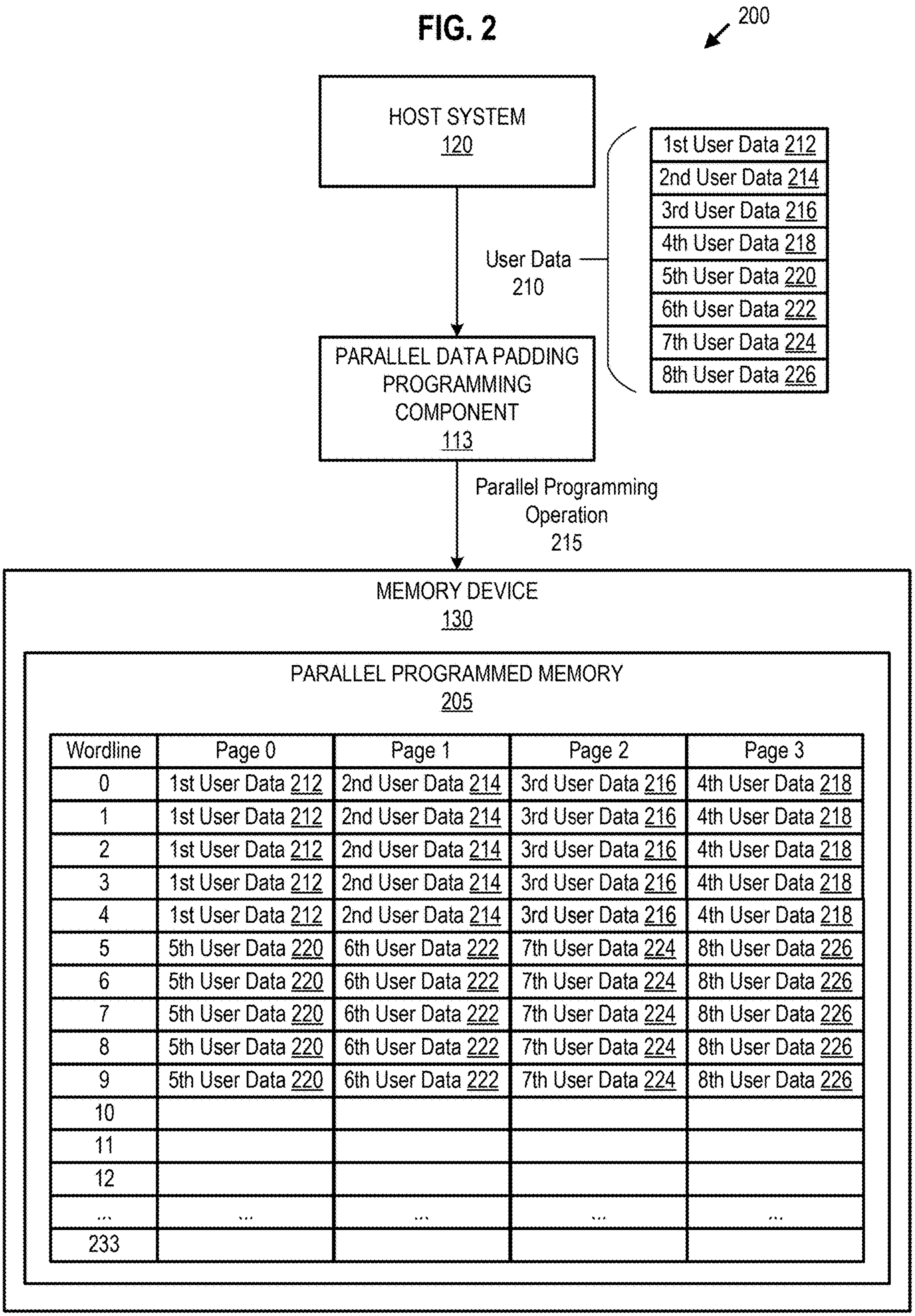

| Wordline | Page 0 | Page 1 | Page 2 | Page 3 |
|---|---|---|---|---|
| 0 | 1st User Data 212 | 2nd User Data 214 | 3rd User Data 216 | 4th User Data 218 |
| 1 | 1st User Data 212 | 2nd User Data 214 | 3rd User Data 216 | 4th User Data 218 |
| 2 | 1st User Data 212 | 2nd User Data 214 | 3rd User Data 216 | 4th User Data 218 |
| 3 | 1st User Data 212 | 2nd User Data 214 | 3rd User Data 216 | 4th User Data 218 |
| 4 | 1st User Data 212 | 2nd User Data 214 | 3rd User Data 216 | 4th User Data 218 |
| 5 | 5th User Data 220 | 6th User Data 222 | 7th User Data 224 | 8th User Data 226 |
| 6 | 5th User Data 220 | 6th User Data 222 | 7th User Data 224 | 8th User Data 226 |
| 7 | 5th User Data 220 | 6th User Data 222 | 7th User Data 224 | 8th User Data 226 |
| 8 | 5th User Data 220 | 6th User Data 222 | 7th User Data 224 | 8th User Data 226 |
| 9 | 5th User Data 220 | 6th User Data 222 | 7th User Data 224 | 8th User Data 226 |
| 10 | | | | |
| 11 | | | | |
| 12 | | | | |
| ... | ... | ... | ... | ... |
| 233 | | | | |

FIG. 3

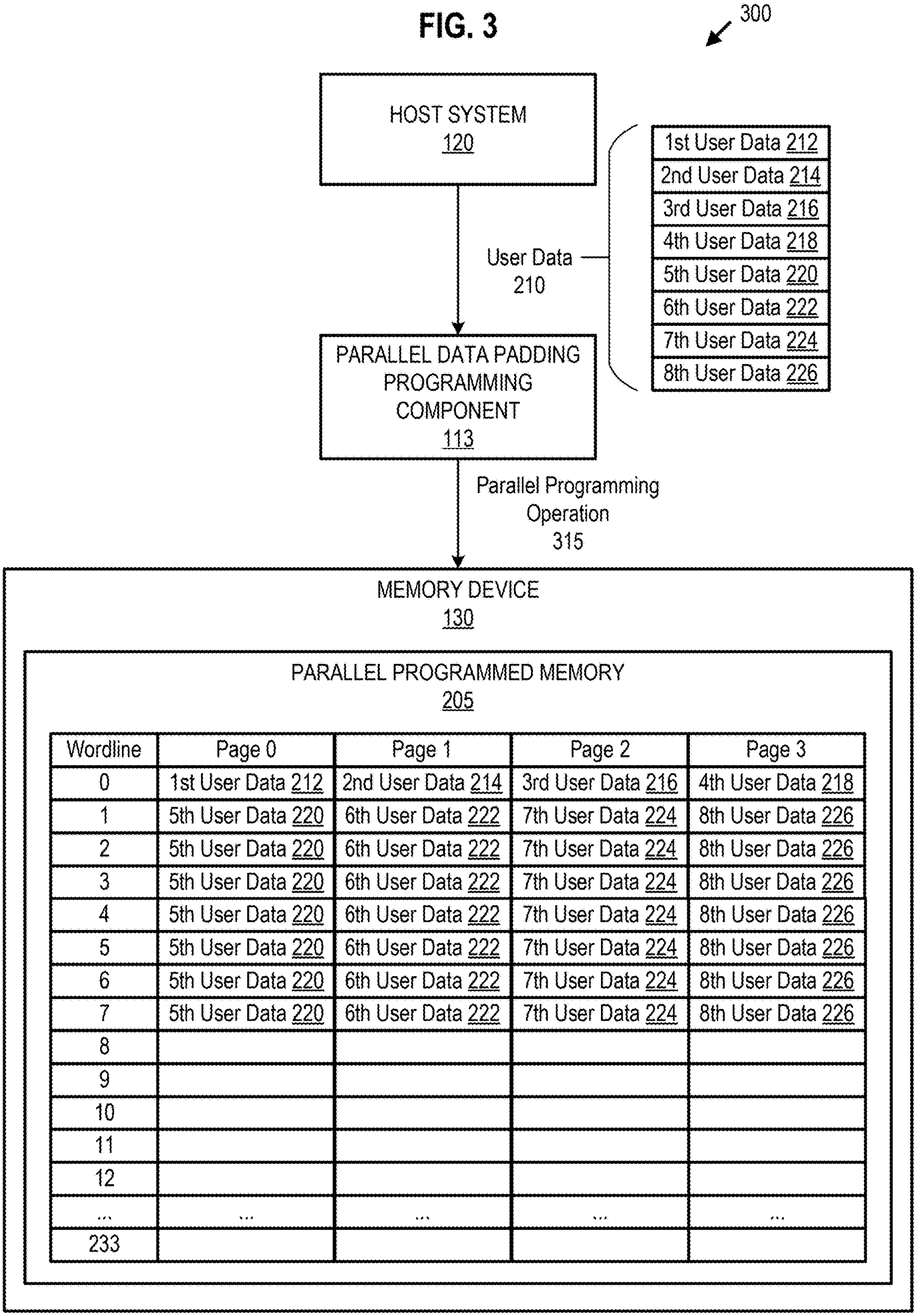

| Wordline | Page 0 | Page 1 | Page 2 | Page 3 |
|---|---|---|---|---|
| 0 | 1st User Data 212 | 2nd User Data 214 | 3rd User Data 216 | 4th User Data 218 |
| 1 | 5th User Data 220 | 6th User Data 222 | 7th User Data 224 | 8th User Data 226 |
| 2 | 5th User Data 220 | 6th User Data 222 | 7th User Data 224 | 8th User Data 226 |
| 3 | 5th User Data 220 | 6th User Data 222 | 7th User Data 224 | 8th User Data 226 |
| 4 | 5th User Data 220 | 6th User Data 222 | 7th User Data 224 | 8th User Data 226 |
| 5 | 5th User Data 220 | 6th User Data 222 | 7th User Data 224 | 8th User Data 226 |
| 6 | 5th User Data 220 | 6th User Data 222 | 7th User Data 224 | 8th User Data 226 |
| 7 | 5th User Data 220 | 6th User Data 222 | 7th User Data 224 | 8th User Data 226 |
| 8 | | | | |
| 9 | | | | |
| 10 | | | | |
| 11 | | | | |
| 12 | | | | |
| ... | ... | ... | ... | ... |
| 233 | | | | |

FIG. 4

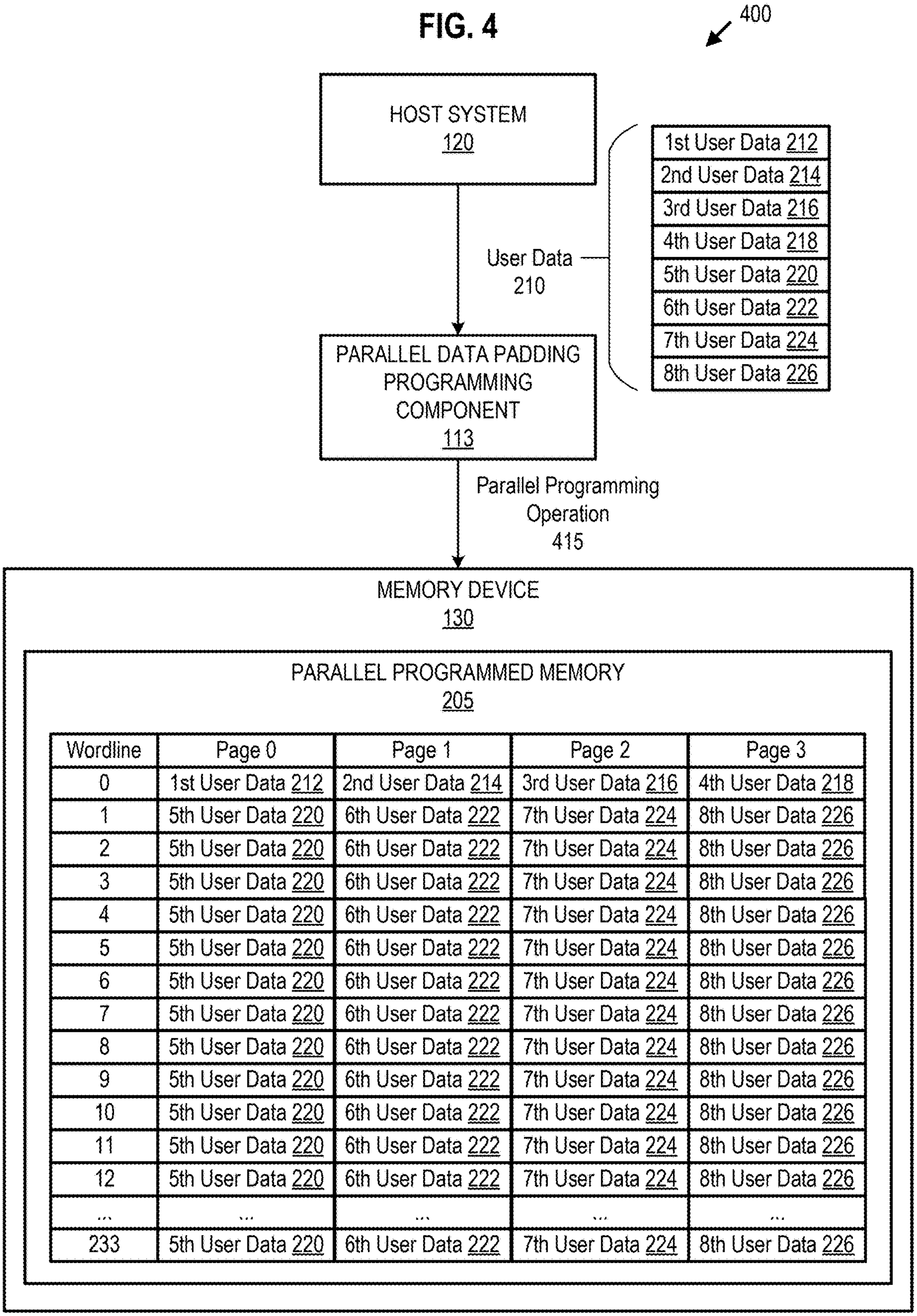

| Wordline | Page 0 | Page 1 | Page 2 | Page 3 |
|---|---|---|---|---|
| 0 | 1st User Data 212 | 2nd User Data 214 | 3rd User Data 216 | 4th User Data 218 |
| 1 | 5th User Data 220 | 6th User Data 222 | 7th User Data 224 | 8th User Data 226 |
| 2 | 5th User Data 220 | 6th User Data 222 | 7th User Data 224 | 8th User Data 226 |
| 3 | 5th User Data 220 | 6th User Data 222 | 7th User Data 224 | 8th User Data 226 |
| 4 | 5th User Data 220 | 6th User Data 222 | 7th User Data 224 | 8th User Data 226 |
| 5 | 5th User Data 220 | 6th User Data 222 | 7th User Data 224 | 8th User Data 226 |
| 6 | 5th User Data 220 | 6th User Data 222 | 7th User Data 224 | 8th User Data 226 |
| 7 | 5th User Data 220 | 6th User Data 222 | 7th User Data 224 | 8th User Data 226 |
| 8 | 5th User Data 220 | 6th User Data 222 | 7th User Data 224 | 8th User Data 226 |
| 9 | 5th User Data 220 | 6th User Data 222 | 7th User Data 224 | 8th User Data 226 |
| 10 | 5th User Data 220 | 6th User Data 222 | 7th User Data 224 | 8th User Data 226 |
| 11 | 5th User Data 220 | 6th User Data 222 | 7th User Data 224 | 8th User Data 226 |
| 12 | 5th User Data 220 | 6th User Data 222 | 7th User Data 224 | 8th User Data 226 |
| ... | ... | ... | ... | ... |
| 233 | 5th User Data 220 | 6th User Data 222 | 7th User Data 224 | 8th User Data 226 |

PADDING MEMORY BY PROGRAMMING USER DATA IN PARALLEL

TECHNICAL FIELD

The present disclosure generally relates to padding memory, and more specifically, relates to padding memory by programming user data in parallel with duplicate user data.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 illustrates another example computing system that includes a memory subsystem in accordance with some embodiments of the present disclosure.

FIG. 3 illustrates another example computing system that includes a parallel data padding programming component in accordance with some embodiments of the present disclosure.

FIG. 4 illustrates another example computing system that includes a parallel data padding programming component in accordance with some embodiments of the present disclosure.

DETAILED DESCRIPTION

Figure 1:
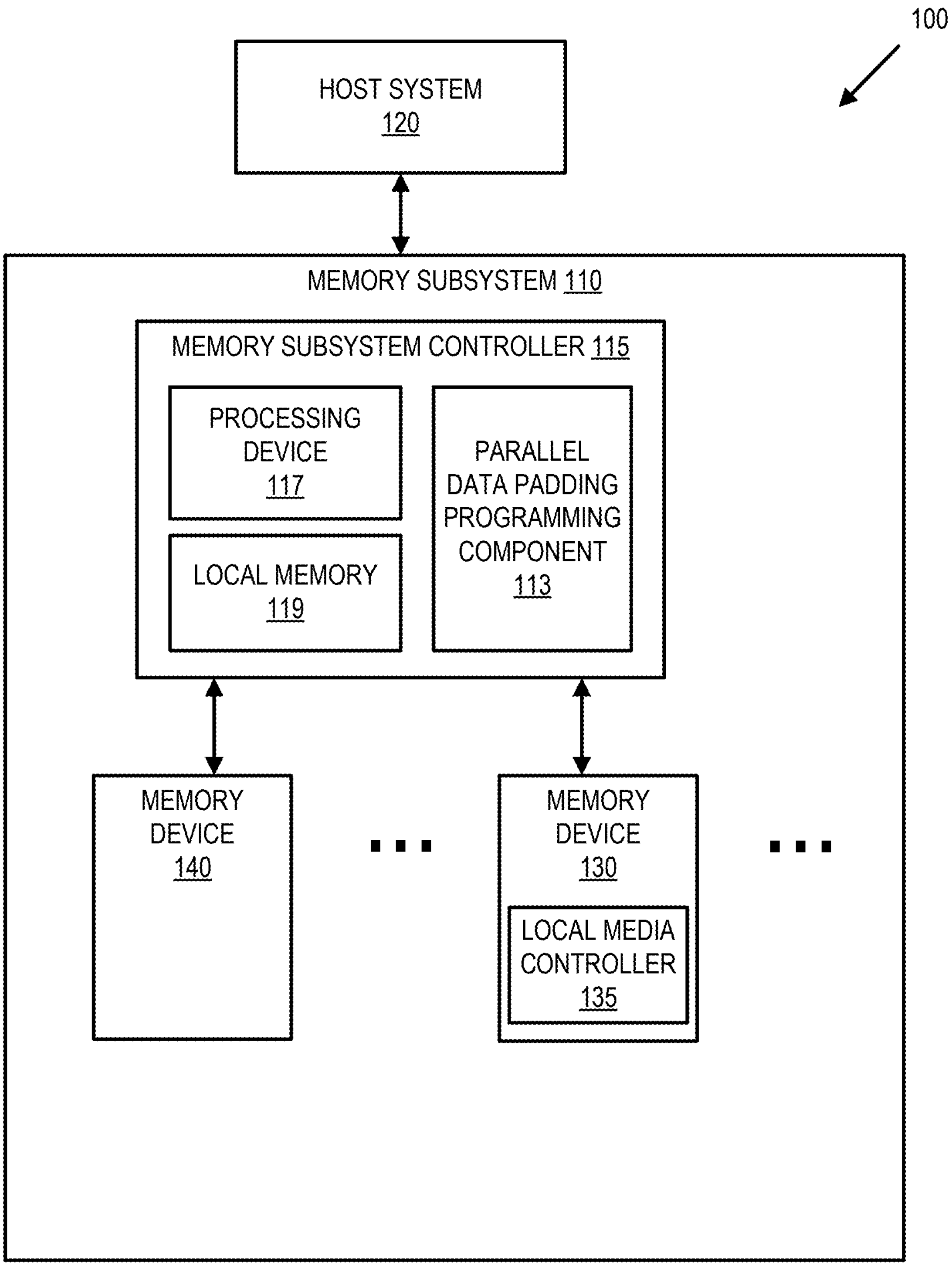
FIG. 1 illustrates an example computing system that includes a memory subsystem in accordance with some embodiments of the present disclosure.

Aspects of the present disclosure are directed to programming data padding in parallel in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units identified by a logical unit number (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), quad-level cells (QLCs), and penta-level cells (PLCs). For example, an SLC can store one bit of information and has two logic states while a QLC can store sixteen bits of information and has sixteen logic states.

In conventional memory systems, leaving wordlines in an erased state can lead to poor data retention and reliability issues. For example, for memory cells with data that neighbor erased memory cells, the memory cells containing data can suffer from lateral charge loss to the neighboring cells due to their erased state. This lateral charge loss increases the chance that the memory cells containing data cannot be read and/or cannot be read accurately, thereby reducing their reliability. Additionally, the voltage thresholds of these memory cells that neighbor erase memory cells shift over time, further reducing the likelihood of being able to accurately read the data from these memory cells. These problems are particularly acute for portions of memory devices that store data permanently or for long periods of time. For example, firmware memory blocks and one-time programmable (OTP) memory blocks can store data for long periods of time and even for the entire lifetime of the memory device. Additionally, since the data stored in these memory blocks tends to be crucial for running the memory subsystem, the reduced reliability from lateral charge loss and shifted voltage threshold is especially problematic. Some conventional memory systems address these issues by filling memory cells that would otherwise be maintained in an erased state with random padding data. Writing this random padding data, however, requires the host device to load the data and requires independent writing for all the padding data. This results in a reduced quality of service for the host as well as increased latency and power consumption for the system as a whole. Additionally, because the padding data is random, it has no meaningful value.

Aspects of the present disclosure address the above and other deficiencies by writing user data in parallel with duplicate user data as padding. For example, the memory subsystem can receive user data and write the user data alongside additional copies of the user data written in parallel as padding data. By performing these writes on adjacent memory portions (e.g., pages and/or wordlines) in parallel, the memory subsystem is able to improve retention by preventing lateral charge migration from erased cells while preserving quality of service for the host and minimizing the latency and power consumption. Furthermore, because the padding data is actual user data, the memory subsystem can use the additional padding data copies to recover the user data should the memory subsystem fail to read the user data.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processing device such as a processor chipset and a software stack executed by the processor chipset. The processor chipset can include one or more cores, one or more caches, a memory controller (e.g., NVDIMM controller), and/or a storage protocol controller (e.g., a peripheral component interconnect express (PCIe) controller, a serial advanced technology attachment (SATA) controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a SATA interface, including a mini-SATA (mSATA) interface, a PCIe interface, including a mini PCIe (mPCIE) interface, a Non-Volatile Memory Express (NVMe) interface, a universal serial bus (USB) interface, an a Fibre Channel, Serial Attached SCSI (SAS), a Small Computer System Interface (SCSI), a double data rate (DDR) memory bus, a dual in-line memory module (DIMM) interface (e.g., DIMM socket interface that supports Double Data Rate (DDR)), an Advanced Host Controller (AHCI) interface, an Open NAND Flash Interface (ONFI) interface, a Double Data Rate (DDR) interface, a Low Power Double Data Rate (LPDDR) interface, any other interface, and/or combinations of these interfaces. The physical host interface can be used to transmit data between the host system 120 and the memory subsystem 110. The host system 120 can further utilize an NVMe interface to access components (e.g., memory devices 130 and 140) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via the same communication connection, multiple separate communication connections, and/or a combination of communication connections.

The memory devices 130 and 140 can include any combination of the different types of non-volatile memory devices and/or volatile memory devices. The volatile memory devices (e.g., memory device 140) can be, but are not limited to, random-access memory (RAM), such as dynamic random-access memory (DRAM), synchronous dynamic random-access memory (SDRAM), video random-access memory (VRAM), and cache memory.

Some examples of non-volatile memory devices (e.g., memory device 130) include negative-and (NAND) type flash memory devices and write-in-place type memory devices, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random-access memory (FeRAM), magneto random-access memory (MRAM), Spin Transfer Torque (STT)-MRAM, nano-RAM (NRAM), silicon-oxide-nitride-oxide-silicon (SONOS) memory, conductive bridging RAM (CBRAM), resistive random-access memory (RRAM), oxide based RRAM (OxRAM), negative-or (NOR) flash memory, and erasable programmable read-only memory (EPROM), including electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The buffer memory of subsystem controller 115 can include any of the volatile or non-volatile memory types mentioned above including combinations thereof. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in memory subsystem 110 (e.g., stored in a local memory 119). In some examples, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processing device or controller separate from the memory subsystem 110).

In general, the memory subsystem controller 115 can receive commands or operations from the host system 120 and can convert the commands or operations into instructions or appropriate commands to achieve the desired access to the memory devices (e.g., memory devices 130 and/or 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA) and/or namespace) and a physical address (e.g., physical block address) that are associated with the memory devices (e.g., memory devices 130 and/or 140). The memory subsystem controller 115 can further include host interface circuitry to communicate with the host system 120 via the physical host interface. The host interface circuitry can convert the commands received from the host system into command instructions to access the memory devices (e.g., memory devices 130 and/or 140) as well as convert responses associated with the memory devices into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices (e.g., memory devices 130 and/or 140).

In some embodiments, the memory devices (e.g., memory devices 130 and/or 140) include local media controllers 135 that operate in conjunction with memory subsystem controller 115 to execute operations on one or more memory cells of the memory devices (e.g., memory devices 130 and/or 140). An external controller (e.g., memory subsystem controller 115) can externally manage the memory devices (e.g., perform media management operations on the memory devices 130 and/or 140). In some embodiments, a memory device (e.g., memory device 130) is a managed memory device, which is a raw memory device combined with a local controller (e.g., local controller 135) for media management within the same memory device package. An example of a managed memory device is a managed NAND (MNAND) device.

The memory subsystem 110 includes a parallel data padding programming component 113 that programs data padding to multiple memory portions in parallel. In some embodiments, the controller 115 includes at least a portion of the parallel data padding programming component 113. For example, the controller 115 can include a processing device 117 configured to execute instructions stored in local memory 119 for performing the operations described herein. In some embodiments, a parallel data padding programming component 113 is part of the host system 120, an application, or an operating system.

The parallel data padding programming component 113 receives commands to program user data to memory portions and programs the user data while programming duplicates of the user data as padding in parallel. Further details with regards to the operations of the parallel data padding programming component 113 are described below.

FIG. 2 illustrates another example computing system 200 that includes a memory subsystem in accordance with some embodiments of the present disclosure. Computing system 200 includes host system 120, parallel data padding programming component 113, and memory device 130. Memory device 130 includes parallel programmed memory 205. In some embodiments, parallel programmed memory 205 is a portion of memory device 130 that includes special blocks for storing important information meant to be retained permanently or for a long period of time. For example, parallel programmed memory 205 is a portion of memory device 130 including a firmware block to store firmware data or a firmware image. In another example, parallel programmed memory 205 is a portion of memory device 130 including a one-time programmable (OTP) memory block such as an OTP block used to store permanent security data.

As shown in FIG. 2, host system 120 sends user data 210 to parallel data padding programming component 113. For example, host system 120 sends user data 210 including $1^{st}$ user data 212, $2^{nd}$ user data 214, $3^{rd}$ user data 216, $4^{th}$ user data 218, $5^{th}$ user data 220, $6^{th}$ user data 222, $7^{th}$ user data 224, and $8^{th}$ user data 226 to parallel data padding programming component 113. Although shown as eight portions, user data 210 can include any number of portions of any size.

In some embodiments, host system 120 sends user data 210 as part of a parallel programming command. For example, host system 120 sends a command to parallel data padding programming component 113 to program user data 210 to multiple portions of memory device 130 in parallel. In some embodiments, the parallel programming command includes a command mode or is otherwise subject to a programming mode. For example, the command mode can include an adjacent command mode, a partial fill command mode, and a full fill command mode. Further details regarding the partial fill command mode and the full fill command mode are described with reference to FIGS. 3 and 4 respectively.

The adjacent command mode programs each portion of user data to a target memory portion of the parallel programmed memory 205 in parallel with one or more adjacent memory portions of the target memory portion. For example, in response to receiving a parallel programming command with an adjacent command mode from host system 120, parallel data padding programming component 113 performs parallel programming operation 215 on parallel programmed memory 205 of memory device 130 which programs a target page with a page of the user data 210 and programs adjacent pages of the target page in parallel with duplicates of the page of user data 210.

As shown in FIG. 2, in response to receiving a parallel programming command (with an adjacent command mode from host system 120 or according to an adjacent command programming mode), parallel data padding programming component 113 programs a first wordline of user data 210 (e.g., $1^{st}$ user data 212, $2^{nd}$ user data 214, $3^{rd}$ user data 216, and $4^{th}$ user data 218) to a target wordline of parallel programmed memory 205 (e.g., wordline 2 of parallel programmed memory 205). Parallel data padding programming component 113 also programs a duplicate of the first wordline of user data 210 to padding wordlines adjacent to the target wordline (e.g., wordlines 0, 1, 3, and 4) in parallel with programming the first wordline of user data 210 to wordline 2 of parallel programmed memory 205. For example, parallel data padding programming component 113 executes a ganged program operation on wordlines 0, 1, 2, 3, and 4 such that the wordlines are programmed in parallel. Because the wordlines are programmed simultaneously, there is no additional overhead time required to program the padding wordlines. For example, the host system 120 does not need to send additional program commands for the padding wordlines or separately send padding data.

In some embodiments, although illustrated as programming entire wordlines in parallel, parallel data padding programming component 113 programs pages in parallel. For example, parallel data padding programming component 113 programs a first page of user data 210 (e.g., $1^{st}$ user data 212) to a target page of parallel programmed memory 205 (e.g., page 0, wordline 2 of parallel programmed memory 205) and programs a duplicate of 1 st user data 212 to padding pages adjacent to the target page (e.g., page 0, wordlines 0, 1, 3, and 4 of parallel programmed memory 205).

In some embodiments, parallel data padding programming component 113 programs a number of duplicates of the first wordline of user data 210 using an adjacent count, with the adjacent count indicating the number of wordlines adjacent to the target wordline to use as padding. For example, in the example shown in FIG. 2, parallel data padding programming component 113 uses an adjacent count of two to program two padding wordlines above the target wordline (e.g., wordlines 0 and 1) and two padding wordlines below the target wordline (e.g., wordlines 3 and 4) in parallel with programming the target wordline.

In some embodiments, parallel data padding programming component 113 receives the adjacent count from host system 120. For example, parallel data padding programming component 113 receives a parallel programming command from host system 120 including the adjacent count of two. In other embodiments, parallel data padding programming component 113 determines the adjacent count. For example, parallel data padding programming component 113 determines the adjacent count using the size of user data 210 and the size of parallel programmed memory 205. In one embodiment, parallel data padding programming component 113 determines the adjacent count such that the product of the number of wordlines of user data 210 and the adjacent count is equal to the total number of empty wordlines of parallel programmed memory 205 (e.g., UserDataSize*AdjacentCount=ParallelProgrammedMemorySize).

As shown in FIG. 2, similarly to the first wordline of user data 210, parallel data padding programming component 113 programs the second wordline of user data 210 (e.g., $5^{th}$ user data 220, $6^{th}$ user data 222, $7^{th}$ user data 224, and $8^{th}$ user data 226) to a second target wordline of parallel programmed memory 205 (e.g., wordline 7 of parallel programmed memory 205) in parallel with programming duplicates of the second wordline of user data 210 to padding wordlines adjacent to the target wordline (e.g., wordlines 5, 6, 8, and 9 of parallel programmed memory 205).

In some embodiments, parallel data padding programming component 113 executes a program verify command on the target wordline in parallel with executing a program verify command on the adjacent padding wordlines. For example, in response to finishing programming the first wordline of user data 210 into wordlines 0, 1, 2, 3, and 4 of parallel programmed memory 205, parallel data padding programming component 113 executes a ganged program verify command on target wordline 2 of parallel programmed memory 205 and adjacent padding wordlines 0, 1, 3, and 4 to verify the correct programming of wordlines 0, 1, 2, 3, and 4.

In some embodiments, because parallel programmed memory 205 includes duplicates of the user data written, parallel data padding programming component 113 uses the duplicates in case of a failure to read and/or decode the user data written to the target wordline. For example, in response to detecting a failure to read the user data written to wordline 2, parallel data padding programming component 113 performs a read operation on one or more of wordlines 0, 1, 3, and 4. Parallel data padding programming component 113 determines the correct user data stored in the wordline using the duplicates read from the one or more of wordlines 0, 1, 3, and 4. For example, in response to failing to read the user data written to wordline 2, parallel data padding programming component 113 reads one or more of the duplicates stored in wordlines 0, 1, 3, and 4. Parallel data padding programming component 113 determines the correct user data for wordline 2, e.g., as the user data shared by the majority of wordlines 0, 1, 3, and 4. In some embodiments, parallel data padding programming component 113 reprograms the target wordline that was subject to the failed read/decoding (e.g., wordline 2) with the duplicate user data.

FIG. 3 illustrates another example computing system 300 that includes a parallel data padding programming component in accordance with some embodiments of the present disclosure. As shown in FIG. 3, parallel data padding programming component 113 performs parallel programming operation 315 on parallel programmed memory 205 of memory device 130.

As discussed above, the parallel programming command can include a command mode or otherwise be subject to a programming mode. The partial fill command mode programs wordlines of the user data to a target memory portion and program the last wordline of the user data to a target wordline of parallel programmed memory 205 in parallel with programming one or more adjacent memory portions of the target memory portion. For example, in response to receiving a parallel programming command with a partial fill command mode from host system 120, parallel data padding programming component 113 performs parallel programming operation 315 on parallel programmed memory 205 of memory device 130.

As shown in FIG. 3, in response to receiving a parallel programming command (with an partial fill command mode from host system 120 or according to a partial fill programming mode), parallel data padding programming component 113 programs a first wordline of user data 210 (e.g., $1^{st}$ user data 212, $2^{nd}$ user data 214, $3^{rd}$ user data 216, and $4^{th}$ user data 218) to a target wordline of parallel programmed memory 205 (e.g., wordline 0 of parallel programmed memory 205). Because the first wordline of user data 210 is not the last wordline of parallel programmed memory 205, parallel data padding programming component 113 does not program duplicates of the first wordline of user data 210 into parallel programmed memory 205.

Parallel data padding programming component 113 programs a second wordline of user data 210 (e.g., $5^{th}$ user data 220, $6^{th}$ user data 222, $7^{th}$ user data 224, and $8^{th}$ user data 226) to a second target wordline of parallel programmed memory 205 (e.g., wordline 1 of parallel programmed memory 205). In response to determining that the second wordline of user data 210 is the final wordline of user data 210, parallel data padding programming component 113 programs duplicates of the second wordline of user data 210 to padding wordlines 2, 3, 4, 5, 6, and 7 in parallel with programming the second wordline of user data 210 to the second target wordline of parallel programmed memory 205. For example, parallel data padding programming component 113 executes a ganged program operation on wordlines 1, 2, 3, 4, 5, 6, and 7 such that the wordlines are programmed in parallel.

In some embodiments, although illustrated as programming entire wordlines in parallel, parallel data padding programming component 113 programs pages in parallel. For example, parallel data padding programming component 113 programs the fifth page of user data 210 (e.g., $5^{th}$ user data 220) to a target page of parallel programmed memory 205 (e.g., page 0, wordline 1 of parallel programmed memory 205) and programs a duplicate of $5^{th}$ user data 220 to padding pages adjacent to the target page (e.g., page 0, wordlines 2, 3, 4, 5, 6, and 7 of parallel programmed memory 205).

In some embodiments, user data 210 does not uniformly fill out the last wordline programmed to parallel programmed memory 205 (e.g., if there is only enough user data 210 for some but not all pages of the wordline of parallel programmed memory 205). In such embodiments, parallel data padding programming component 113 determines random padding pages for the missing pages and programs the random padding pages in parallel with programming duplicates of the random padding pages to one or more adjacent pages of parallel programmed memory 205.

In some embodiments, parallel data padding programming component 113 programs a number of duplicates of the second wordline of user data 210 using a partial fill count. For example, in the example shown in FIG. 3, parallel data padding programming component 113 uses partial fill count of six to program six padding wordlines below the target wordline (e.g., wordlines 2, 3, 4, 5, 6, and 7) in parallel with programming the target wordline.

In some embodiments, parallel data padding programming component 113 receives the partial fill count from host system 120. For example, parallel data padding programming component 113 receives a parallel programming command from host system 120 including a partial fill count of six. In other embodiments, parallel data padding programming component 113 determines the partial fill count. For example, parallel data padding programming component 113 determines the partial fill count using the size of user data 210 and the size of parallel programmed memory 205. In one embodiment, parallel data padding programming component 113 determines the partial fill count such that the sum of the number of wordlines of user data 210 and the partial fill count is equal to the total number of empty wordlines of parallel programmed memory 205 (e.g., UserDataSize+AdjacentCount=ParallelProgrammedMemorySize).

FIG. 4 illustrates another example computing system 400 that includes a parallel data padding programming component in accordance with some embodiments of the present disclosure. As shown in FIG. 4, parallel data padding programming component 113 performs parallel programming operation 415 on parallel programmed memory 205 of memory device 130.

Again, the parallel programming command can include a command mode or otherwise be subject to a programming mode. The full fill command mode programs wordlines of the user data to a target memory portion and program the last wordline of the user data to a target wordline of parallel programmed memory 205 in parallel with programming the remaining empty memory portions of the target memory portion. For example, in response to receiving a parallel programming command with a full fill command mode from host system 120, parallel data padding programming component 113 performs parallel programming operation 415 on parallel programmed memory 205 of memory device 130.

As shown in FIG. 4, in response to receiving a parallel programming command (with an full fill command mode from host system 120 or according to a full fill programming mode), parallel data padding programming component 113 programs a first wordline of user data 210 (e.g., $1^{st}$ user data 212, $2^{nd}$ user data 214, $3^{rd}$ user data 216, and $4^{th}$ user data 218) to a target wordline of parallel programmed memory 205 (e.g., wordline 0 of parallel programmed memory 205). Because the first wordline of user data 210 is not the last wordline of parallel programmed memory 205, parallel data padding programming component 113 does not program duplicates of the first wordline of user data 210 into parallel programmed memory 205.

Parallel data padding programming component 113 programs a second wordline of user data 210 (e.g., $5^{th}$ user data 220, $6^{th}$ user data 222, $7^{th}$ user data 224, and $8^{th}$ user data 226) to a second target wordline of parallel programmed memory 205 (e.g., wordline 1 of parallel programmed memory 205). In response to determining that the second wordline of user data 210 is the final wordline of user data 210, parallel data padding programming component 113 programs duplicates of the second wordline of user data 210 to all remaining wordlines (e.g., wordlines 2-233) of parallel programmed memory 205 in parallel with programming the second wordline of user data 210 to the second target wordline of parallel programmed memory 205. For example, parallel data padding programming component 113 executes a ganged program operation on wordlines 1-233 such that the wordlines are programmed in parallel.

Figure 5:
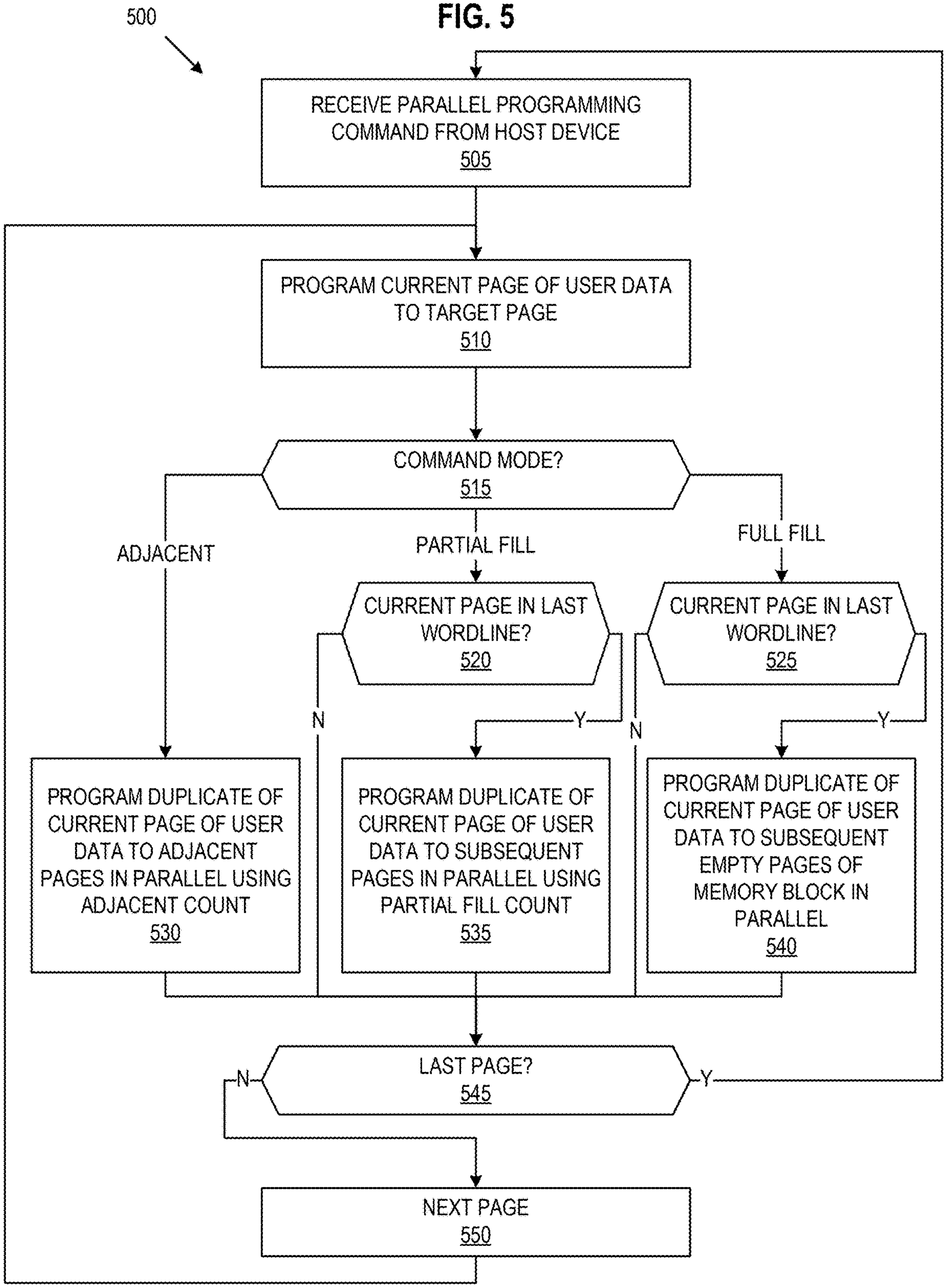
FIG. 5 is a flow diagram of an example method to program data padding in parallel in accordance with some embodiments of the present disclosure.

FIG. 5 is a flow diagram of an example method 500 to program data padding in parallel, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the parallel data padding programming component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing device receives a parallel programming command from a host device. For example, parallel data padding programming component 113 receives a parallel programming command from host system 120 including user data 210. In some embodiments, the parallel programming command includes a command mode. In some embodiments, the parallel programming command includes a parallel programming count. For example, when the command mode is an adjacent command mode, the parallel programming command includes an adjacent count and when the command mode is a partial fill command mode, the parallel programming command includes a partial fill count.

At operation 510, the processing device programs a current page of user data to a target page. For example, parallel data padding programming component 113 programs 1$^{st}$ user data 212 to page 0, wordline 2 of parallel programmed memory 205.

At operation 515, the processing device determines the command mode for the parallel programming command. For example, parallel data padding programming component 113 determines the command mode based on the parallel programming command received from host system 120. In some embodiments, parallel data padding programming component 113 determines the command mode based on one or more bits in the parallel programming command. If the processing device determines that the command mode is an adjacent command mode, the method 500 proceeds to operation 530. If the processing device determines that the command mode is a partial fill command mode, the method 500 proceeds to operation 535. If the processing device determines that the command mode is a full fill command mode, method 500 proceeds to operation 540.

At operation 520, the processing device determines whether the current page is in the last wordline. For example, with reference to FIG. 3, parallel data padding programming component 113 determines that 1$^{st}$ user data 212 is in wordline 0 and that 1$^{st}$ user data is 212 is therefore not the last wordline of user data 210. As an alternate example with reference to FIG. 3, parallel data padding programming component 113 determines that 5$^{th}$ user data 220 is in wordline 1 and that 5$^{th}$ user data 220 is therefore in the last wordline of user data 210. If the processing device determines that the current page is in the last wordline and the command mode is a partial fill command mode, the method 500 proceeds to operation 535. If the processing device determines that the current page is not in the last wordline, the method 500 proceeds to operation 545.

At operation 525, the processing device determines whether the current page is in the last wordline. For example, with reference to FIG. 4, parallel data padding programming component 113 determines that 1$^{st}$ user data 212 is in wordline 0 and that 1$^{st}$ user data is 212 is therefore not the last wordline of user data 210. As an alternate example with reference to FIG. 4, parallel data padding programming component 113 determines that 5$^{th}$ user data 220 is in wordline 1 and that 5$^{th}$ user data 220 is therefore in the last wordline of user data 210. If the processing device determines that the current page is in the last wordline and the command mode is a full fill command mode, the method 500 proceeds to operation 540. If the processing device determines that the current page is not in the last wordline, the method 500 proceeds to operation 545.

At operation 530, the processing device programs a duplicate of the current page of user data to adjacent pages of the target page in parallel with programming the current page of user data to the target page using the adjacent count. For example, as described with reference to FIG. 2, parallel data padding programming component 113 executes a ganged programming operation using 1$^{st}$ user data 212 on page 0, wordlines 0-4 of parallel programmed memory 205 and programs the pages in parallel.

At operation 535, the processing device programs a duplicate of the current page of user data to subsequent pages of the target page in parallel with programming the current page of user data to the target page using the partial fill count. For example, as described with reference to FIG. 3, parallel data padding programming component 113 executes a ganged programming operation using 5$^{th}$ user data 220 on page 0, wordlines 1-7 of parallel programmed memory 205 to program the pages in parallel.

At operation 540, the processing device programs a duplicate of the current page of user data to subsequent empty pages of the memory block in parallel with programming the current page of user data to the target page. For example, as described with reference to FIG. 4, parallel data padding programming component 113 executes a ganged programming operation using 5$^{th}$ user data 220 on page 0, wordlines 1-233 of parallel programmed memory 205 to program the pages in parallel.

At operation 545, the processing device determines whether the current page is the last page. For example, parallel data padding programming component 113 determines whether there are any more pages in user data 210. If the processing device determines that the current page is the last page, the method 500 returns to operation 505. If the processing device determines that the current page is not the last page, the method 500 proceeds to operation 550.

At operation 550, the processing device proceeds to the next page of user data. For example, with reference to FIG. 3, after programming 1$^{st}$ user data 212, parallel data padding programming component 113 loads 2$^{nd}$ user data 214 to program to parallel programmed memory 205.

Figure 6:
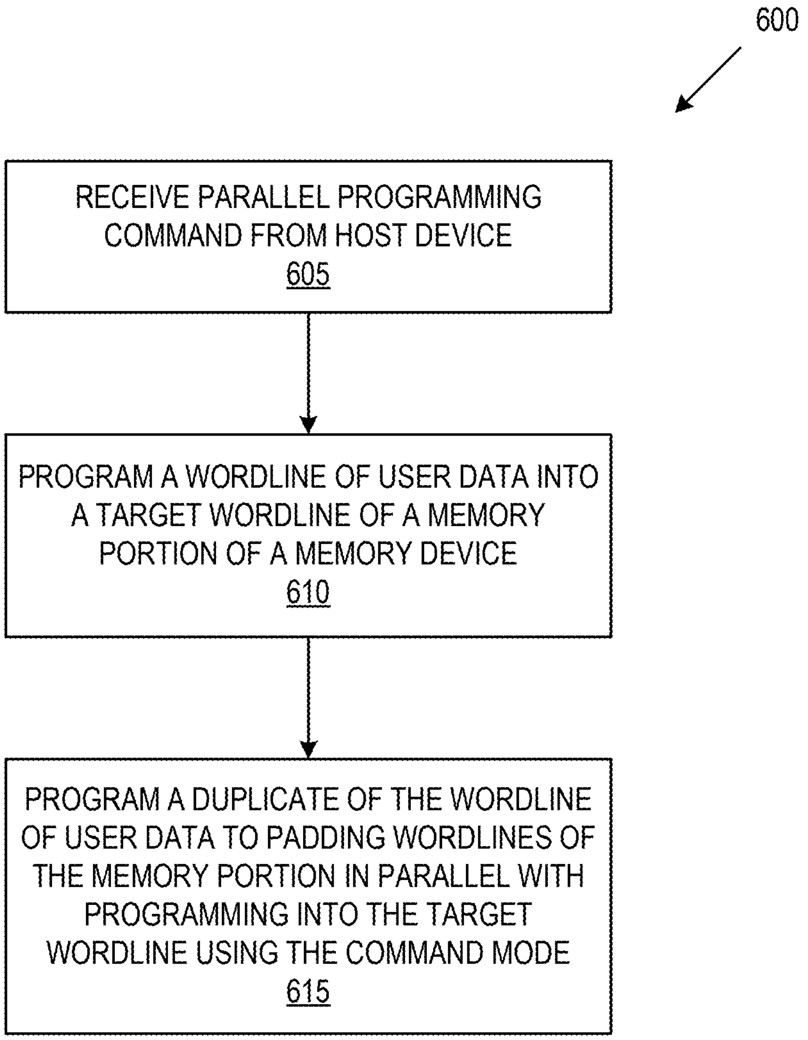
FIG. 6 is another flow diagram of an example method to program data padding in parallel in accordance with some embodiments of the present disclosure.

FIG. 6 is a flow diagram of an example method 600 to program data padding in parallel, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the parallel data padding programming component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 605, the processing device receives a parallel programming command from a host device. For example, parallel data padding programming component 113 receives a parallel programming command from host system 120 including a command and user data. In some embodiments, the parallel programming commands includes an adjacent count and/or a partial fill count.

At operation 610, the processing device programs a wordline of user data into a target wordline of a memory portion of a memory device. For example, parallel data padding programming component 113 performs a programming operation to program a wordline of the user data received in the parallel programming command into a firmware block of memory device 130 (e.g., parallel programmed memory 205).

At operation 615, the processing device programs a duplicate of the wordline of user data into padding wordlines of the memory portion in parallel with programming into the target wordline using the command mode. For example, if the command mode is an adjacent command mode, parallel data padding programming component 113 programs the user data into the target wordline and programs a duplicate of the user data into a number of adjacent wordlines (e.g., above and below the target wordline). As an alternative example, if the command mode is a partial fill command mode, parallel data padding programming component 113 programs the user data into the target wordline and programs a duplicate of the user data into a number of subsequent wordlines (e.g., below the target wordline). As yet another example, if the command mode is a full fill command mode, parallel data padding programming component 113 programs the user data into the target wordline and programs a duplicate of the user data into all empty subsequent wordlines.

Figure 7:
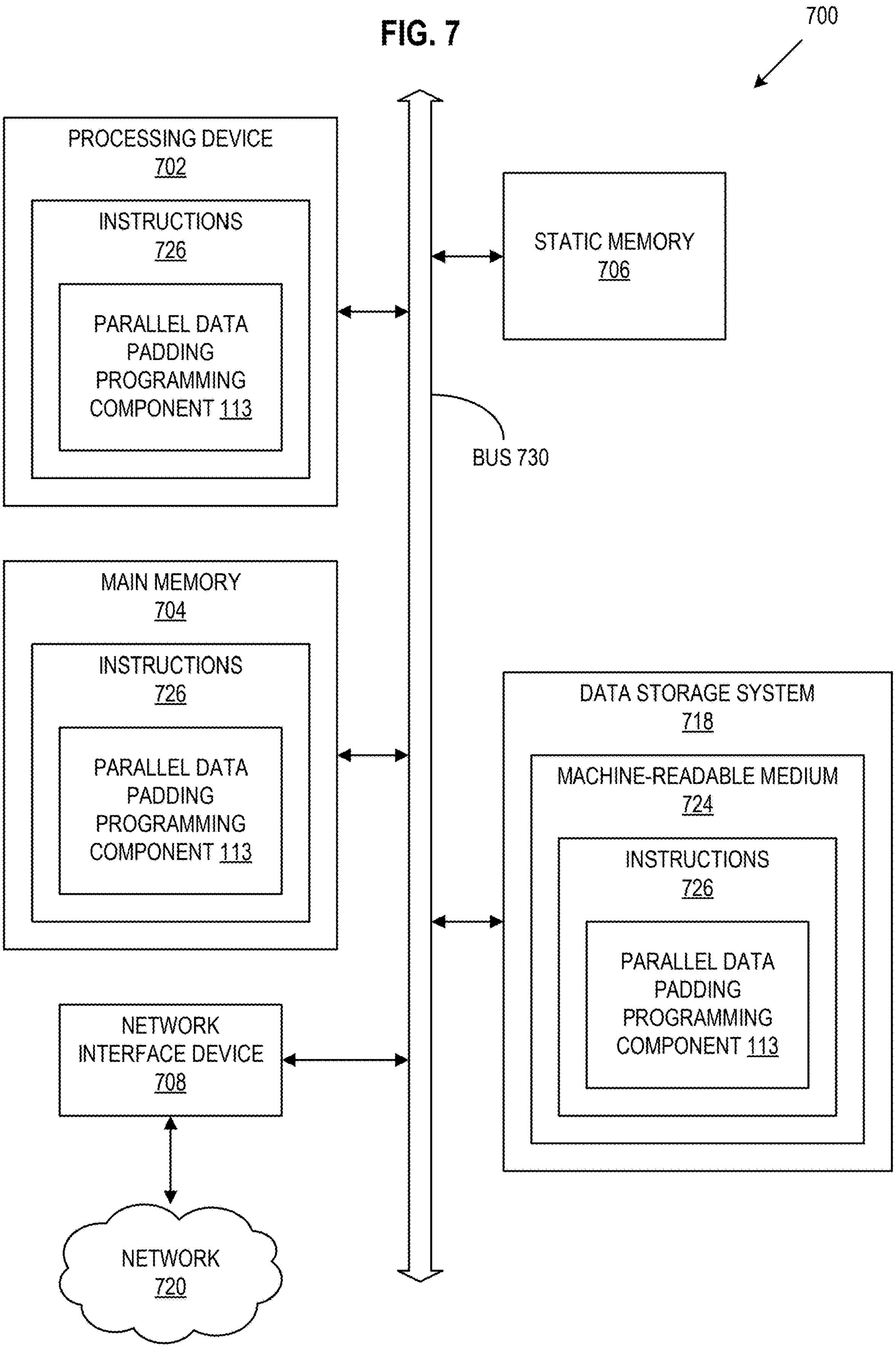
FIG. 7 is a block diagram of an example computer system in which embodiments of the present disclosure may operate.

FIG. 7 illustrates an example machine of a computer system 700 within which a set of instructions for causing the machine to perform any one or more of the methodologies discussed herein can be executed. In some embodiments, the computer system 700 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the parallel data padding programming component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a smart device, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random-access memory (DRAM) such as synchronous DRAM (SDRAM) or Rambus DRAM (RDRAM), etc.), a static memory 706 (e.g., flash memory, static random-access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726, constituting machine-readable storage media, can also reside, completely or at least partially, within the main memory 704 and/or within the processing device 702 during execution thereof by the computer system 700, the main memory 704 and the processing device 702. The machine-readable storage medium 724, data storage system 718, and/or main memory 704 can correspond to the memory subsystem 10 of FIG. 1.

In one embodiment, the instructions 726 include instructions to implement functionality corresponding to a parallel data padding programming component (e.g., parallel data padding programming component 113 of FIG. 1). While the machine-readable storage medium 724 is shown in an example embodiment to be a single medium, the term "machine-readable storage medium" should be taken to include a single medium or multiple media that store the one or more sets of instructions (e.g., instructions 726). The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 500 and/or 600 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random-access memories (RAMs), EPROMs, EEPROMs, magnetic or optical cards, or any type of media suitable for storing electronic instructions coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

receiving, by a memory subsystem, a parallel programming command from a host device, wherein the parallel programming command includes a plurality of wordlines of user data and is subject to a first command mode of a plurality of command modes;

determining a number of padding wordlines using the first command mode, wherein the number of padding wordlines for the first command mode is different from a number of padding wordlines for a second command mode of the plurality of command modes;

programming a wordline of user data of the plurality of wordlines of user data into a target wordline of a memory portion of a memory device; and programming a duplicate of the wordline of user data to the number of padding wordlines of the memory portion in parallel with the programming of the target wordline.

2. The method of claim 1, wherein the first command mode is an adjacent command mode, the method further comprising:

determining the number of padding wordlines for a target wordline using an adjacent count, wherein the adjacent count indicates the number of padding wordlines and wherein programming the duplicate of the wordline of user data comprises programming the duplicate of the wordline of user data to the number of padding wordlines adjacent to the target wordline.

3. The method of claim 2, further comprising:

determining the adjacent count using a size of the user data and a size of the memory portion.

4. The method of claim 1, wherein the first command mode is a partial fill command mode and wherein the parallel programming command further includes a partial fill count, the method further comprising:

determining the number of padding wordlines using the partial fill count;

determining a last wordline of the plurality of wordlines of user data, wherein programming the duplicate of the wordline of user data comprises programming the duplicate of the last wordline to the number of padding wordlines subsequent to the last wordline.

5. The method of claim 1, wherein the first command mode is a full fill command mode, the method further comprising:

determining a last wordline of the plurality of wordlines of user data, wherein determining the number of padding wordlines comprises determining a number of wordlines of the memory portion subsequent to the last wordline.

6. The method of claim 1, further comprising:

verifying the programming of the wordline of the plurality of wordlines of user data into the target wordline and the number of padding wordlines in parallel.

7. The method of claim 1, further comprising:

performing a first read operation on a first wordline of the plurality of wordlines of the memory portion programmed in parallel;

determining that the first read operation failed; and performing a second read operation on a second wordline of the number of padding wordlines of the memory portion programmed in parallel in response to determining that the first read operation failed.

8. A non-transitory computer-readable storage medium comprising instructions that, when executed by a processing device, cause the processing device to:

receive, by a memory subsystem, a parallel programming command from a host device, wherein the parallel programming command includes a plurality of wordlines of user data and is subject to a first command mode of a plurality of command modes;

determine a number of padding wordlines using the first command mode, wherein the number of padding wordlines for the first command mode is different from a number of padding wordlines for a second command mode of the plurality of command modes;

program a wordline of user data of the plurality of wordlines of user data into a target wordline of a memory portion of a memory device; and program a duplicate of the wordline of user data to the number of padding wordlines of the memory portion in parallel with the programming of the target wordline.

9. The non-transitory computer-readable storage medium of claim 8, wherein the first command mode is an adjacent command mode and wherein the processing device is further to:

determine the number of padding wordlines for a target wordline using an adjacent count, wherein the adjacent count indicates the number of padding wordlines and wherein programming the duplicate of the wordline of user data comprises programming the duplicate of the wordline of user data to the number of padding wordlines adjacent to the target wordline.

10. The non-transitory computer-readable storage medium of claim 9, wherein the processing device is further to:

determine the adjacent count using a size of the user data and a size of the memory portion.

11. The non-transitory computer-readable storage medium of claim 8, wherein the first command mode is a partial fill command mode, wherein the parallel programming command further includes a partial fill count, and wherein the processing device is further to:

determine the number of padding wordlines using the partial fill count;

determine a last wordline of the plurality of wordlines of user data, wherein programming the duplicate of the wordline of user data comprises programming the duplicate of the last wordline to the number of padding wordlines subsequent to the last wordline.

12. The non-transitory computer-readable storage medium of claim 8, wherein the first command mode is a full fill command mode and wherein the processing device is further to:

determine a last wordline of the plurality of wordlines of user data, wherein determining the number of padding wordlines comprises determining a number of wordlines of the memory portion subsequent to the last wordline.

13. The non-transitory computer-readable storage medium of claim 8, wherein the processing device is further to:

verify the programming of the wordline of the plurality of wordlines of user data into the target wordline and the number of padding wordlines in parallel.

14. The non-transitory computer-readable storage medium of claim 8, wherein the processing device is further to:

perform a first read operation on a first wordline of the plurality of wordlines of the memory portion programmed in parallel;

determine that the first read operation failed; and perform a second read operation on a second wordline of the number of padding wordlines of the memory portion programmed in parallel in response to determining that the first read operation failed.

15. A system comprising:

a plurality of memory devices; and a processing device, operatively coupled with the plurality of memory devices, to:

receive, by a memory subsystem, a parallel programming command from a host device, wherein the parallel programming command includes a plurality of wordlines of user data and is subject to a first command mode of a plurality of command modes;

determine a number of padding wordlines using the first command mode, wherein the number of padding wordlines for the first command mode is different from a number of padding wordlines for a second command mode of the plurality of command modes;

program a wordline of user data of the plurality of wordlines of user data into a target wordline of a memory portion of a memory device;

program a duplicate of the wordline of user data to the number of padding wordlines of the memory portion in parallel with the programming of the target wordline; and verify the programming of the wordline of the plurality of wordlines of user data into the target wordline and the number of padding wordlines in parallel.

16. The system of claim 15, wherein the first command mode is an adjacent command mode and wherein the processing device is further to:

determine the number of padding wordlines for a target wordline using an adjacent count, wherein the adjacent count indicates the number of padding wordlines and wherein programming the duplicate of the wordline of user data comprises programming the duplicate of the wordline of user data to the number of padding wordlines adjacent to the target wordline.

17. The system of claim 16, wherein the processing device is further to:

determine the adjacent count using a size of the user data and a size of the memory portion.

18. The system of claim 15, wherein the first command mode is a partial fill command mode, wherein the parallel programming command further includes a partial fill count, and wherein the processing device is further to:

determine the number of padding wordlines using the partial fill count;

determine a last wordline of the plurality of wordlines of user data, wherein programming the duplicate of the wordline of user data comprises programming the duplicate of the last wordline to the number of padding wordlines subsequent to the last wordline.

19. The system of claim 15, wherein the first command mode is a full fill command mode and wherein the processing device is further to:

determine a last wordline of the plurality of wordlines of user data, wherein determining the number of padding wordlines comprises determining a number of wordlines of the memory portion subsequent to the last wordline.

20. The system of claim 15, wherein the processing device is further to:

perform a first read operation on a first wordline of the plurality of wordlines of the memory portion programmed in parallel;

determine that the first read operation failed; and perform a second read operation on a second wordline of the number of padding wordlines of the memory portion programmed in parallel in response to determining that the first read operation failed.

* * * * *